(12) United States Patent
Jones

(10) Patent No.: US 6,614,606 B2
(45) Date of Patent: Sep. 2, 2003

(54) METHODS AND APPARATUS FOR PROVIDING COLOR IMAGES FROM MONOCHROMATIC NIGHT VISION AND OTHER ELECTRO-OPTICAL VIEWING DEVICES

(75) Inventor: Peter W. J. Jones, Belmont, MA (US)

(73) Assignee: Tenebraex Corporation, Boston, MA (US)

( * ) Notice: Subject to any disclaimer, the term of this patent is extended or adjusted under 35 U.S.C. 154(b) by 0 days.

(21) Appl. No.: 09/791,416

(22) Filed: Feb. 23, 2001

(65) Prior Publication Data

US 2002/0067560 A1 Jun. 6, 2002

Related U.S. Application Data

(60) Provisional application No. 60/184,234, filed on Feb. 23, 2000.

(51) Int. Cl.$^7$ ................................................ G02B 5/22
(52) U.S. Cl. .................... 359/885; 359/887; 359/889; 359/890; 359/891; 359/892; 359/350; 348/223; 348/235; 348/342
(58) Field of Search ................................. 359/885, 887, 359/889, 890, 891, 892, 350; 348/237, 223, 235, 342

(56) References Cited

U.S. PATENT DOCUMENTS

| 2,971,093 | A | * | 2/1961 | Garbuny | ..................... 359/887 |
| 3,736,050 | A | | 5/1973 | Bolum | |
| 4,085,421 | A | | 4/1978 | Gilmour | |
| 4,800,474 | A | * | 1/1989 | Bornhorst | ................... 359/889 |

OTHER PUBLICATIONS

PCT Search Report.

* cited by examiner

*Primary Examiner*—Audrey Chang
*Assistant Examiner*—Leo Boutsikaris
(74) *Attorney, Agent, or Firm*—Edwards & Angell, LLP; Peter F. Corless; William J. Daley, Jr.

(57) ABSTRACT

Apparatus and methods for converting a monochrome night vision or other electro-optical device into one that provide a sensation of full color, including from red to blue with white and black. Preferred apparatus of the invention comprise an electro-optical viewing device, particularly a monochromatic night vision device, that comprises a plurality of light filters. A first light filter system is positioned at a light-input end of the device, and a second light filter system is positioned at a light-output end of the device, whereby the plurality of filters systems provide to a viewer a sensation of full color, including from red to blue with white and black.

36 Claims, 3 Drawing Sheets

US 6,614,606 B2

METHODS AND APPARATUS FOR PROVIDING COLOR IMAGES FROM MONOCHROMATIC NIGHT VISION AND OTHER ELECTRO-OPTICAL VIEWING DEVICES

The present application claims the benefit of U.S. provisional application No. 60/184,234, Feb. 23, 2000, incorporated herein by reference.

INTRODUCTION

This invention relates generally to techniques and apparatus for converting a monochromatic night vision device or other electro-optical device to produce a full-color output.

BACKGROUND OF THE INVENTION

The vast majority of night vision devices have a monochromatic output. They typically work by using a lens to focus light from a scene onto the front of a sensor or image intensifier tube. The image is amplified and finally output on a phosphor display screen. While night vision (NV) is itself a great enhancement of normal human vision, it is sometimes desirable to have a NV device with a fill-color output, for example to better differentiate an object one is searching for from its background environment.

At present, typical methods of achieving a full-color NV device have been by the use of an especially sensitive and highly amplified CCD device (television camera). Alternatively, by the use of three separate image intensifier tubes, selected or filtered so as to be sensitive to the red, green and blue portions of the spectrum. The outputs of these three tubes are then fused by the use of partially silvered prisms or mirrors or by integrating them in an interlaced red, green and blue (RGB) television-type display tube.

Among the disadvantages of these techniques are higher power usage, added weight, increased optical complexity compared to a simple image intensifier NV device, and susceptibility to being knocked out of alignment. In addition, CCD devices are not effective image intensifiers and thus limit the light amplification possible. Note also that many night vision devices are designed to be mounted on the user's head, a position where excess weight can be a problem. In addition, there is a vast installed base of monochromatic NV systems.

It thus would be desirable to have new methods and apparatus to provide color output from monochromatic-output NV systems.

SUMMARY OF THE INVENTION

The invention provides apparatus that comprises an electro-optical viewing device, particularly a monochromatic night vision device, that comprises a plurality of light filters. In this system, a first light filter system is positioned at a light-input end of the device, and a second light filter system is positioned at a light-output end of the device, whereby the plurality of filters systems provide a color output to a viewer. The filter systems preferably comprise filters for radiation (light) in the visible and/or infrared ranges. The system preferably provides an output of a full range of colors red to blue, including black, greys and/or white.

Preferably, a filter system comprise at least two types of filters, i.e. a first and second filter, whereby the first filter can pass radiation of a higher wavelength than the second filter, i.e. the first filter is a "high pass" filter and the second filter is a "low pass" filter. The first and second filters may suitably pass radiation of the same wavelength provided the filters also each pass radiation of differing wavelength. In particularly preferred aspects of the invention, the maximum wavelength passed or transmitted by the first filter is about the same (e.g. precisely the same or with about 1, 2, 3, 4, 5, 6, 7, 8, 9 or 10 nm) as the minimum wavelength passed by the second filter. For example, in one preferred filter system, the high pass filter transmits radiation of about 580 nm and shorter, and the low pass filter transmits radiation of about 580 nm or longer. In another preferred system, the high pass filter transmits radiation of about 580 nm and shorter, and the low pass filter transmits radiation of about 580 nm or longer.

In particular preferred systems of the invention, the filter system positioned at the light-output portion of the electro-optical viewing device comprises high pass and low pass filters, and the filter system positioned at the light-input portion of the device comprises high pass and low pass filters.

Even more preferably, those filter systems are linked, whereby the high pass filter in the front of the device is aligned with the high pass filter in the rear of the device, and the low pass filter in the front of the device is aligned with the low pass filter in the rear of the device.

In a filter system, the separate filter elements (e.g. low pass filter and high pass filter) may suitably comprise substantially equal surface areas in the system or have differing surface areas, e.g. where the high pass filter of the system has a larger surface area than the low pass filter, or conversely where the low pass filter has a larger surface area than the high pass filter of the system.

Apparatus of the invention also may comprise a further filter element that can block transmission of near infrared radiation to an input end of device. For example, the filter may only pass radiation about 710 nm or shorter, or about 750 nm or shorter. The filter suitably may be removable as desired by a user and may be positioned at the radiation input end of the electro-optical viewing device. Such blocking of the near infrared can help provide an image of greater accuracy by blocking infrared light from a scene that can give a false color rendition (i.e. where objects such as foliage that are highly reflective in the infrared appear light or reddish).

Filters systems of the invention can be of a variety of types, including electrically operated filters, as well as a rotating or oscillating filter system. In a preferred aspect of the invention, a structure comprises a rotating or oscillating axle shaft that is mounted parallel to the optical axis of a night vision (NV) device. A disk (filter wheel) mounting one or more filters, or one or more filters and open apertures, is fixed to the front end of the axle so that the filter(s) and aperture(s) will pass in front of the imaging sensor (forward of or behind the objective lens). At the rear of the NV device a second filter wheel is fixed to the axle, such that when a certain section of the forward filter wheel is positioned in front of the optical device's sensor, a corresponding section of the second filter wheel is positioned behind the eyepiece lens or screen of the NV device. The axle is spun or oscillated manually or by means of a small motor.

In this way, in a lightweight and uncomplicated manner, the filtration of incoming image-forming light is synchronized with the filtration of the amplified output image. The axle is spun or oscillated at a rate such that the switching between filter and open aperture or between different filters is such that the viewer sees a merging of the different color images, producing the impression of viewing a full-color scene. There are several strategies possible for the selection of the filters for the invention. One would be to use three color separation filters in the front filter wheel: red, green and blue. Red, green and blue filters would also be used correspondingly in the rear filter wheel, so that when the sensor was being exposed to only red light, the display would be filtered to give a red output, and likewise green for green and blue for blue. If the filter wheels switch at a rapid enough rate, the viewer will see a full-color scene. Note that with this strategy, the output phosphors have to give off red, green and blue light.

Other filter configurations are possible. The perception of a full color output can be obtained when viewing an output utilizing only two color filters, e.g. two quite narrow-band colors.

For example, if the front filter wheel has an open aperture corresponding to an open aperture on the rear filter wheel, and a low-pass filter corresponding to a red filter on the rear filter wheel, the device output will be perceived as being full color (by this we mean that in the output image, colors have the correct "names"). In this example, the NV device's output phosphors would need to have red and non-red shorter-wavelength output (yellow, green, blue, etc).

If one desires to have an output that is perceived as full-color while using a phosphor screen that is only of a green color, then one strategy would be to have a front filter wheel with a high-pass filter and a low-pass filter and a rear filter wheel with corresponding high-pass green and low-pass green filters. Although the output will be muted in its perceived full-color scheme, the colors will have the correct "names."

Alternatively, the front filter wheel could have an open aperture and low-pass filter corresponding to a rear filter wheel with a high-pass green and low-pass green filters.

Alternatively, the front filter wheel could have a cyan-red low-pass filter corresponding to a rear filter wheel with a low-pass green filter.

In a further alternative arrangement, the front filter wheel could have a high pass and a low pass filter corresponding to a rear filter wheel with a cyan pass and a red pass filter.

Again, alternatively, the front filter wheel could have a high pass and a low pass filter corresponding to a rear filter wheel with a cyan and shorter pass filter and a yellow and longer pass filter.

In these cases above, the rear filter wheel could also have an open aperture combined with a high-band or high pass filter. Alternatively, the rear filter wheel could have an open aperture combined with a low-band or low-pass filter. What is important is to have an output that gives different lightness values for different "color" objects in the image when they are perceived by the different kinds of receptors in the retina.

According to Retinex theory, the comparative lightness values of a surface as perceived by the different spectrally sensitive receptors in the retina are what a viewer uses to determine that surface's "color." Many night vision devices have extended sensitivity into the near infrared spectrum. Since foliage has a high "lightness" value in the infrared range, with certain filtration strategies mentioned above foliage could be perceived as red/brown rather than green in color. Different strategies in the selection of the filters could be used to adjust this or other important colors. For example, color perception of foliage seen through the system could be shifted back to a "green" color by combining an IR blocking filter with a low-pass red filter on the front filter wheel, or with both filters on the front filter wheel. In this way the lightness of the foliage in the combined red-IR range would be reduced. In some applications it may be desirable to have foliage rendered in a lighter value so that objects or people located in the foliage are easier to discern. Then, the infrared blocking filter may be selected so that some near infrared light is passed. In this way, the foliage will be rendered as a light brown rather than a darker green color.

In order for the different color images coming to the user's eye to fuse, the filter wheels need to be spun or oscillated fast enough so that the filter sections pass the eye faster than about 15 times per second, including over 20 cycles/second. One technique to speed up the filter cycle rate without an excessive axle rate would be to put multiple sequences of the filters on each wheel.

This method of producing the sensation of full-color output can disable a viewer's automatic white balance (i.e., seeing colors as consistent under different color temperature light sources, such as tungsten and daylight). In order to adjust the color rendition of this device's output to give a neutral rendition under different light sources, the balance at the rear of the device between the amount of light transmitted through the high and low pass filters can be adjusted by the use of neutral density filters on one or the other of the filters. Alternatively, this can be achieved by varying the proportion of the area of the filter system that is given to each filter.

Other aspects of the invention are disclosed infra.

BRIEF DESCRIPTION OF THE DRAWINGS

The invention can be described in more detail with the help of the accompanying drawings wherein.

DETAILED DESCRIPTION OF THE INVENTION

As discussed above, the invention provides apparatus that comprises an electro-optical viewing device, particularly a mono-chromatic night vision device, that comprises a plurality of light filters. Preferably, a first light filter system is positioned at a light-input end of the device, and a second light filter system is positioned at a light-output end of the device, whereby the plurality of filters systems provide a color output to a viewer. Preferably, a filter system comprise at least two types of filters, a high pass filter and a low pass filter.

As discussed above, a variety of filter systems may be utilized. In one preferred apparatus of the invention, at least two filter wheels are utilized and fixed to a rotating or oscillating shaft that lies parallel to the optical axis of the device. The optical device looks through the first filter wheel and the output image of the device is observed through the second filter wheel. Thus, when a certain section of the first filter wheel is in front of the optical device's sensor a corresponding section of the second filter wheel is positioned behind the eyepiece lens or screen of the device. The filter wheels each have one or more filters mounted on them and may also have one or more open aperture sections.

Figure 1:
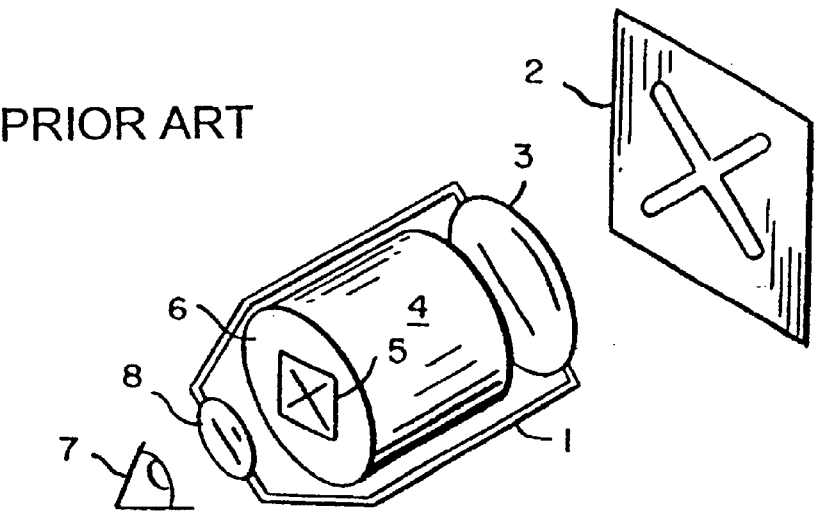
FIG. 1 depicts a cut-away view of a typical night vision device with its subject and intensified image.

Referring now to the drawings, FIG. 1 shows a typical night vision (NV) device 1, where light from a subject 2 is focused by an objective lens 3 onto the front of an image intensifier tube 4. The amplified image 5 is displayed on a phosphor screen 6 where the user 7 can view it through the eyepiece lens 8.

Figure 2:
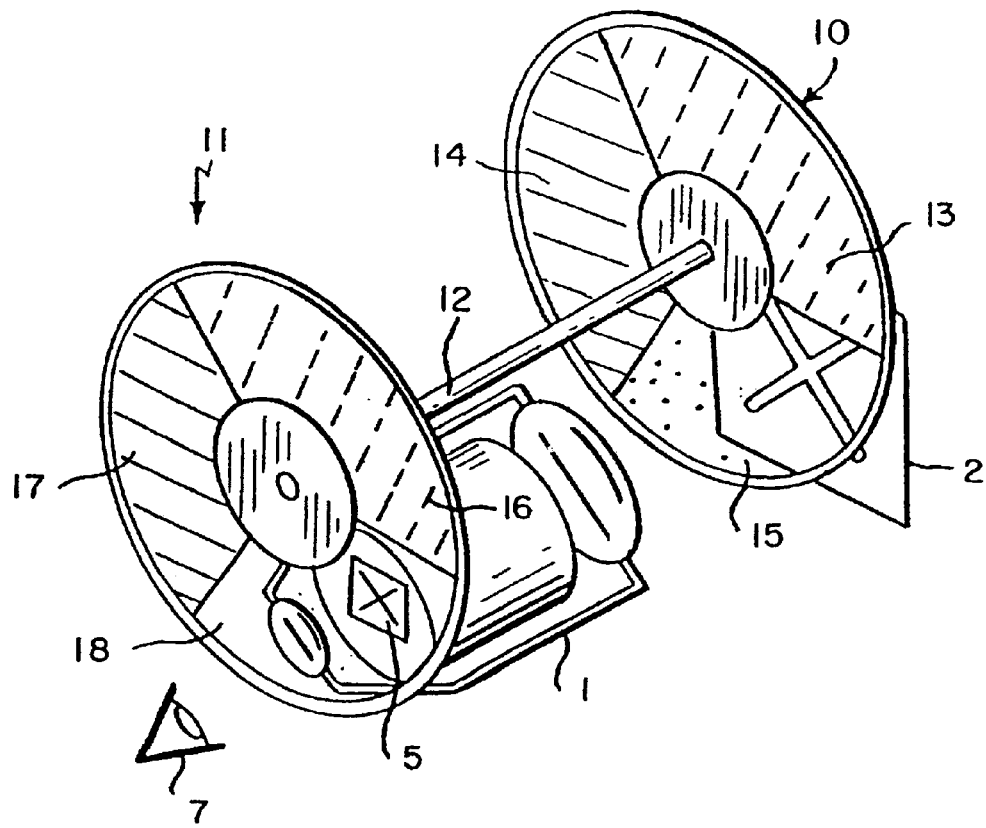
FIG. 2 depicts diagrammatically a particular embodiment of a structure in accordance with the invention, with a forward three-filter wheel and a rear three-filter wheel fixed to an axle that lies parallel to the optical axis of a NV device.

FIG. 2 shows diagrammatically one particular embodiment of a structure in accordance with the invention for a method of converting monochromatic night vision or other electro-optical viewing devices to portray a full-color image. As seen therein, filter wheel 10 is positioned in front of, and a second filter wheel 11 is positioned behind night vision device 1. The two filter wheels are mounted on and connected by axle 12. In this manner, when the red filter section 13 of the forward wheel is positioned in front of the night vision device, the red filter section 16 of the rear wheel in positioned between the user 7 and the output image 5. Likewise, when green filter 14 is in front of the device, green filter 17 will be positioned between the viewer and the output image, and when blue filter 15 is positioned in front of the device, blue filter 18 will be positioned between the viewer and the output image.

Figure 3:
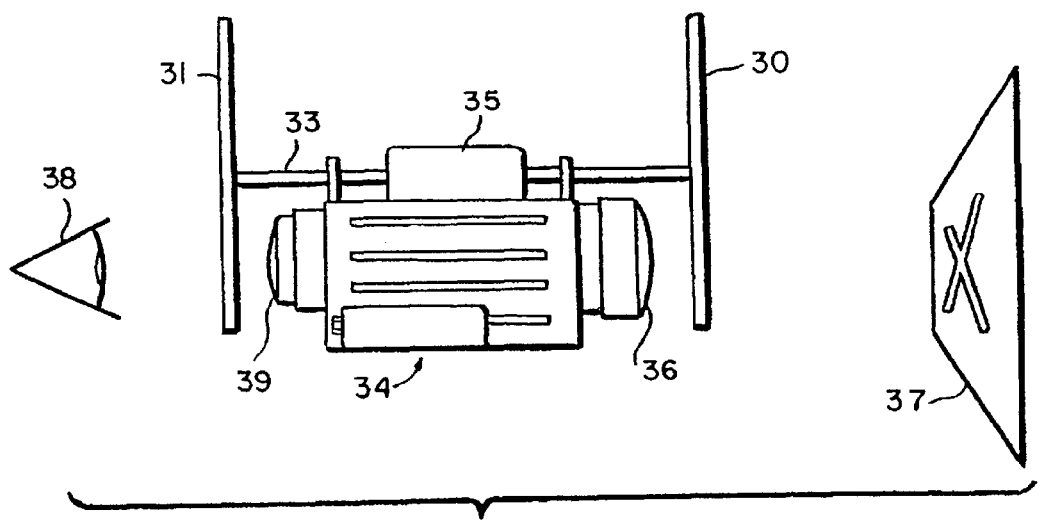
FIG. 3 depicts a side view of a particular embodiment of a structure in accordance with the invention, where an axle and motor are mounted to a NV device and where a forward three-filter wheel and a rear three-filter wheel are fixed to the axle. The axle is orientated so that it lies parallel to the optical axis of the NV device.

FIG. 3 shows a side view of another particular embodiment of a structure in accordance with the invention where front filter wheel 30 and rear filter wheel 31 are fixed on an axle 33 that is mounted to a night vision device 34. A motor 35 is connected to the axle 33 so as to spin it. As can be seen, this arrangement lets the objective lens 36 of the NV device view the subject 37 through a specific section of filter wheel 30 while the user 38 views the output 39 of the NV device through a specific section of filter wheel 31.

Figures 4, 5:
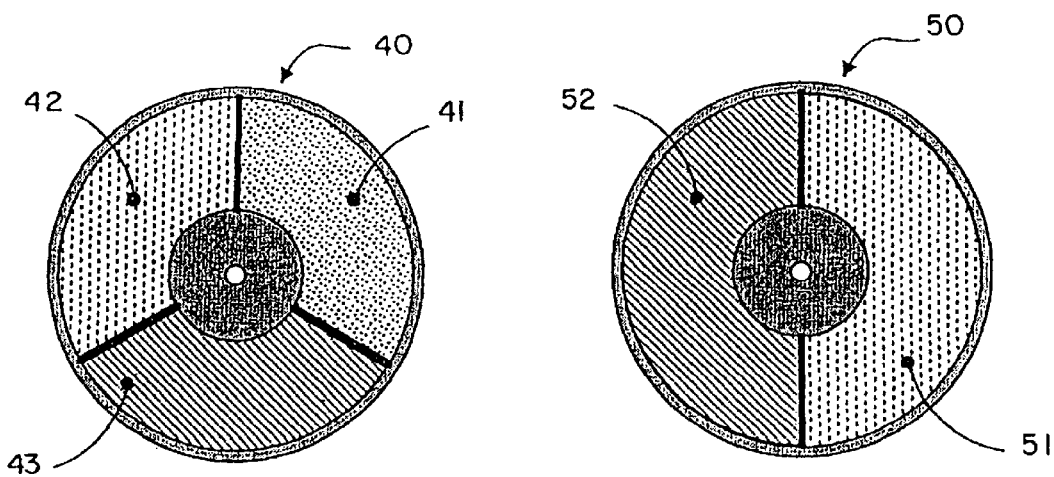
FIG. 4 depicts a view of the filter wheel of a particular embodiment of a structure in accordance with the invention, where the wheel contains three filter sections.
FIG. 5 depicts a view of the filter wheel of a particular embodiment of a structure in accordance with the invention, where the wheel contains two filter sections.

FIG. 4 shows a one embodiment of the a filter wheel 40 which has three different filters 41, 42 and 43 mounted on it so that as the wheel is spun, the three filters will pass in sequence in front of the sensor or behind the display of the optical device.

FIG. 5 shows an alternate embodiment of a filter wheel 50 which has two different filters 51 and 52 mounted on it so that as the wheel is spun, the two filters will pass in sequence in front of the sensor or behind the display of the optical device.

Figure 6:
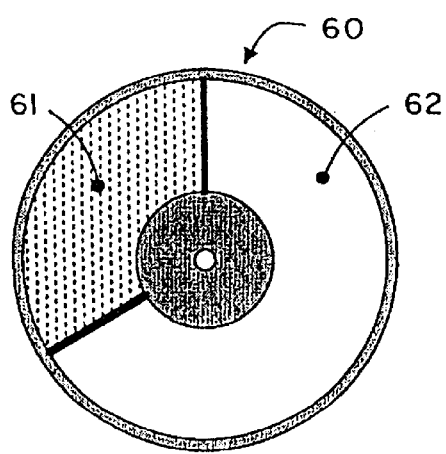
FIG. 6 depicts a view of the filter wheel of a particular embodiment of a structure in accordance with the invention, where the wheel contains one filter section and an open aperture.

FIG. 6 shows an alternate embodiment of a filter wheel 60 which has one filter 61 mounted on it and an open aperture 62. As the wheel is spun, the filter and the open aperture will pass in sequence in front of the sensor or behind the display of the optical device.

Figure 7:
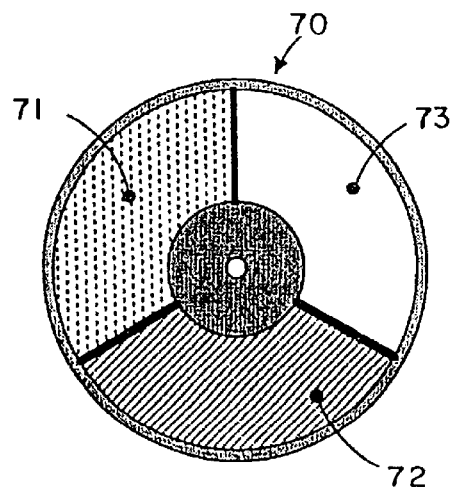
FIG. 7 depicts a view of the filter wheel of a particular embodiment of a structure in accordance with the invention, where the wheel contains two filter sections and an open aperture.

FIG. 7 shows yet another alternate embodiment of a filter wheel 70 which has two filters 71 and 72 mounted on it and an open aperture 73. As the wheel is spun, the filters and the open aperture will pass in sequence in front of the sensor or behind the display of the optical device.

Figure 8:
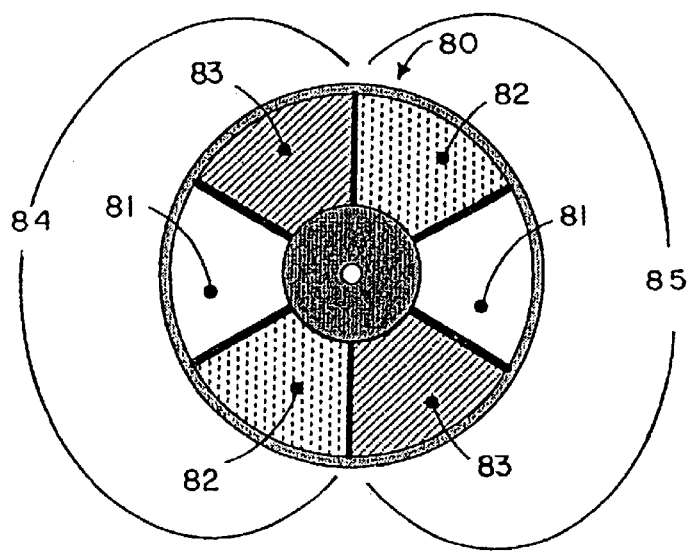
FIG. 8 depicts a view of the filter wheel of a particular embodiment of a structure in accordance with the invention, where the wheel contains two filter and an open aperture, each of which are divided into two separate sections.

FIG. 8 shows yet another alternate embodiment of a filter wheel 80 which has two sequences of filter/apertures. That is, each sequence has two open apertures 81, two filters of one type 82 and two filters of another type 83. These form two filter/aperture sequences 84 and 85. The wheel can therefore be spun at one-half the rotational rate of a single sequence filter wheel while maintaining the same flicker rate. The number of filter or filter aperture sequences can be selected for each front/rear wheel set to meet design needs.

Structures in accordance with the invention can be relatively easily fabricated for mounting on many different of night vision and other monochromatic electro-optical devices. Filters for use in the systems of the invention are commercially available, or can be readily constructed.

Other modifications of the invention will occur to those in the art within the spirit and scope of the invention. Hence, the invention is not to be construed as limited to the particular embodiments discussed and shown in the figures, except as defined by the appended claims.

What is claimed is:

1. An electro-optical viewing device that comprises a plurality of light filters, a first light filter system positioned at a light-input end of the device, and a second light filter system positioned at a light-output end of the device, the first and second filter systems each comprising a high pass filter and a low pass filter.

2. The device of claim 1 wherein the device provides a sensation of a full color output to a viewer.

3. The device of claim 2 wherein the device provides a sensation of a full range of color from red to blue, and including white, gray and/or black.

4. The device of any one of claims 1 through 3 wherein the high pass filter and the low pass filter of the first filter system transmit radiation of differing wavelength.

5. The device of any one of claims 1 through 3 wherein the high pass filter and the low pass filter of the second filter system transmit overlapping bands of light with the high pass filter transmitting predominately light of shorter wavelength than light transmitted by the low pass filter.

6. The device of any one of claims 1 through 3 wherein the high pass filter and low pass filter do not transmit radiation of the same wavelength.

7. The device of any one of claims 1 through 3 wherein the second filter system comprises a high pass filter that transmits radiation of about 580 nm or shorter, and a low pass filter that transmits radiation of about 580 nm or longer.

8. The device of any one of claims 1 through 3 wherein the first filter system comprises a high pass filter that transmits radiation of about 580 nm or greater, and the low pass filter transmits radiation of about 580 nm or longer.

9. The device of any one of claims 1 through 3 wherein the device further comprises a filter element at the light-input end that blocks transmission of near infrared radiation.

10. The device of any one of claims 1 through 3 wherein the first and second filter systems comprise filters for transmission of light in the visible and/or infrared ranges.

11. The device of any one of claims 1 through 3 wherein the device has a substantially monochromatic output in the absence of the filter systems.

12. The device of any one of claims 1 through 3 wherein the device comprises a night vision device.

13. An electro-optical viewing device that comprises a plurality of light filters, a first light filter system positioned at a light-input end of the device, and a second light filter system positioned at a light-output end of the device, wherein:

the plurality of filter systems provides a color output to a viewer; and the filter systems provide sensation of a full range of color including white, grays and/or black to a viewer.

14. The device of claim 13 wherein the device is a night vision device.

15. The device of claim 13 wherein the first and second filter systems are connected and rotate or oscillate during use.

16. The device of claim 15 wherein the first and second filter systems are connected by at least one shaft that runs substantially parallel to an optical axis of the device.

17. The device of claim 16 wherein the shaft rotates or oscillates during use of the device.

18. The device of claim 15 wherein the first and second filter systems rotate by one of manual action or a motorized system.

19. The device of any one of claims 16 or 17 wherein the first and second filter systems rotate by one of manual action or a motorized system.

20. The device of claim 15 wherein the first filter and second filter systems are mounted on a first wheel and second wheel respectively, and the first and second wheels rotate in a direction substantially perpendicular to a device optical axis during use of the device.

21. The device of claim 20 wherein the first wheel contains at least one filter element and at least one aperture.

22. The device of claim 20 wherein the first wheel contains at least two filter elements and at least one aperture.

23. The device of claim 20 wherein the first wheel contains at least two filter elements and at least two apertures.

24. The device of claim 13 wherein the first filter system comprises at least three filter elements, each element being a different color.

25. The device of claim 24 wherein a first element is red, a second element is green and a third element is blue.

26. The device of claim 24 wherein the second filter system comprises at least three filter elements, each element being a different color.

27. The device of claim 26 wherein a first element of the second filter system is red, a second element of the second filter system is green and a third element of the second filter system is blue.

28. The device of claim 13 wherein the first filter system consists of a single filter element and an aperture, and the second filter system consists of one or two separate filter elements.

29. The device of claim 28 wherein the second filter system consists of one or two filter elements that pass light differentially of shorter and longer wavelengths.

30. The device of claim 29 wherein the second filter system transmits comparatively short and longer wavelengths of green light.

31. The device of claim 28 wherein the first filter system comprise an aperture and a narrow, low pass filter.

32. The device of claim 28 wherein the first and second filters are each rotated whereby switching between different colored elements of each filter, or switching between a colored element and an aperture, occurs faster than about 15 times per second.

33. A device of any one of claims 1, 2, 3, or 13 wherein the second filter system of the device comprises a neutral density filter.

34. A device of any one of claims 1 through 3 wherein the high and low pass filters of a filter system have differing surface area.

35. The device of claim 7 wherein the high pass filter of the first filter system transmits radiation of about 580 nm or greater, and the low pass filter of the first filter system transmits radiation of about 580 nm or longer.

36. The device of claim 13 wherein the first and second filter systems comprise filters for light in the visible and/or infrared ranges.

* * * * *